United States Patent
Klinger

Patent Number: 5,275,443
Date of Patent: Jan. 4, 1994

[54] SLIDING COLLAR QUICK CONNECT

[75] Inventor: Gary Klinger, Allen Park, Mich.

[73] Assignee: ITT Corporation, New York, N.Y.

[21] Appl. No.: 945,054

[22] Filed: Sep. 15, 1992

[51] Int. Cl.$^5$ ............................................. F16L 37/14
[52] U.S. Cl. ..................... 285/82; 285/305; 285/319; 285/322
[58] Field of Search ............... 285/305, 319, 322, 323, 285/82, 39, 249, 309; 403/315, 316, 320, 326

[56] References Cited

U.S. PATENT DOCUMENTS

| | | | |
|---|---|---|---|
| 3,885,851 | 5/1975 | Bennett | 285/319 X |
| 3,909,046 | 9/1975 | Legris | 285/39 |
| 4,244,608 | 1/1981 | Stuemky | |
| 4,836,580 | 6/1989 | Farrell | 285/319 X |
| 4,902,045 | 2/1990 | McGugan et al. | 285/82 X |

FOREIGN PATENT DOCUMENTS 477129 10/1975 Australia ............... 285/249

Primary Examiner—Randolph A. Reese
Assistant Examiner—G. Spisich
Attorney, Agent, or Firm—Dykema Gossett

[57] ABSTRACT

The present invention is a quick connector preferably for use in connecting a fuel filler neck to a fuel tank. The connector includes a housing having a first end which receives a tube or nipple having an upset portion which is preferably mounted to the fuel tank. The connector includes a sliding collar with expandable fingers, a compression ring mounted about the collar and retaining forks for retaining the collar and ring within the housing. The upset can be inserted past the expandable fingers with little force. When the tube is attempted to be withdrawn, the compression ring compresses the fingers about the tube restricting release requiring exceedingly larger forces to remove the tube. The opposite end of the connector of the disclosed embodiment includes a quick connect for connecting a hose to the housing. This connector includes a compression sleeve which is mounted about the hose and compressed by a locking ring which locks to the housing.

25 Claims, 2 Drawing Sheets

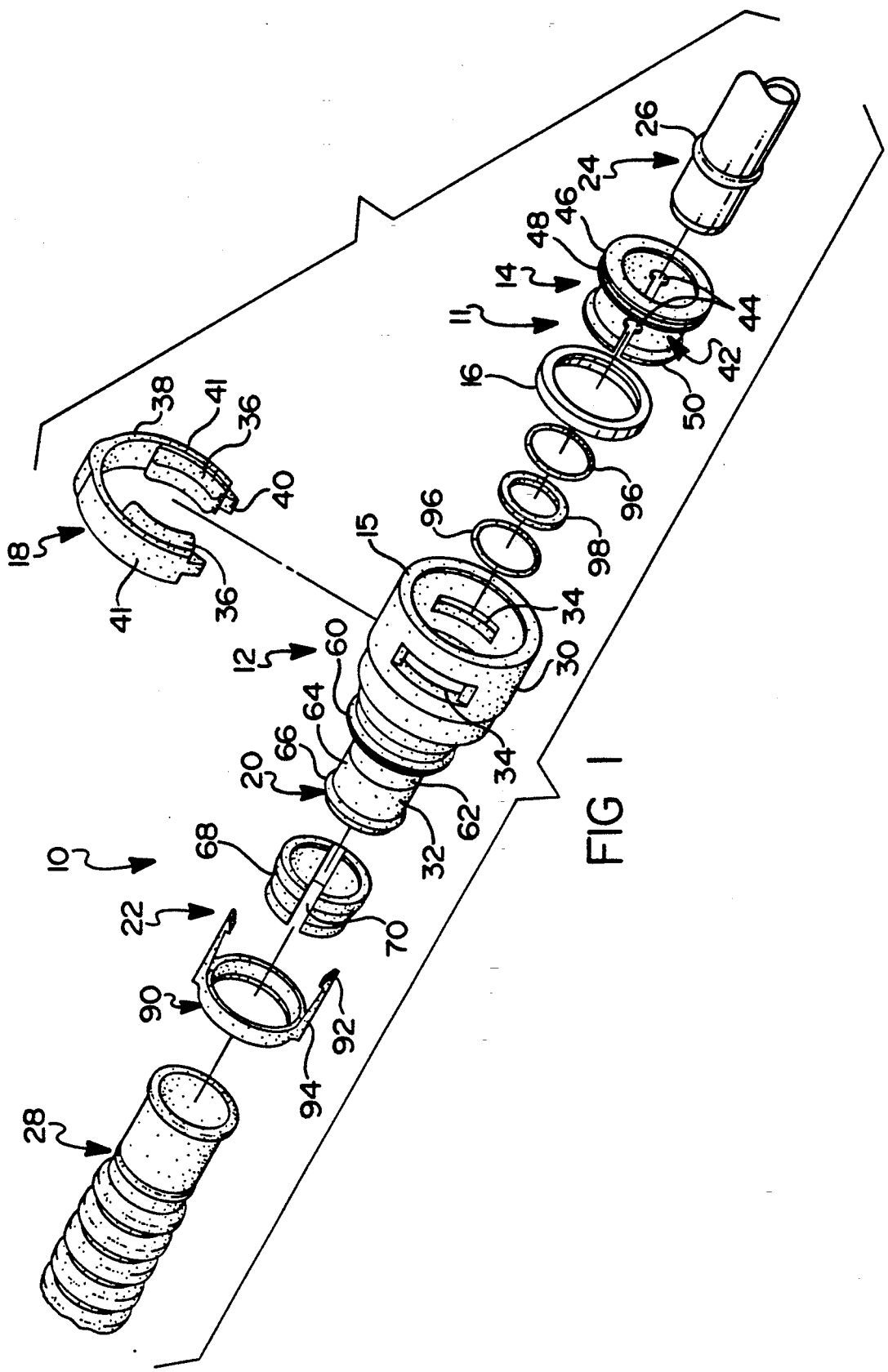

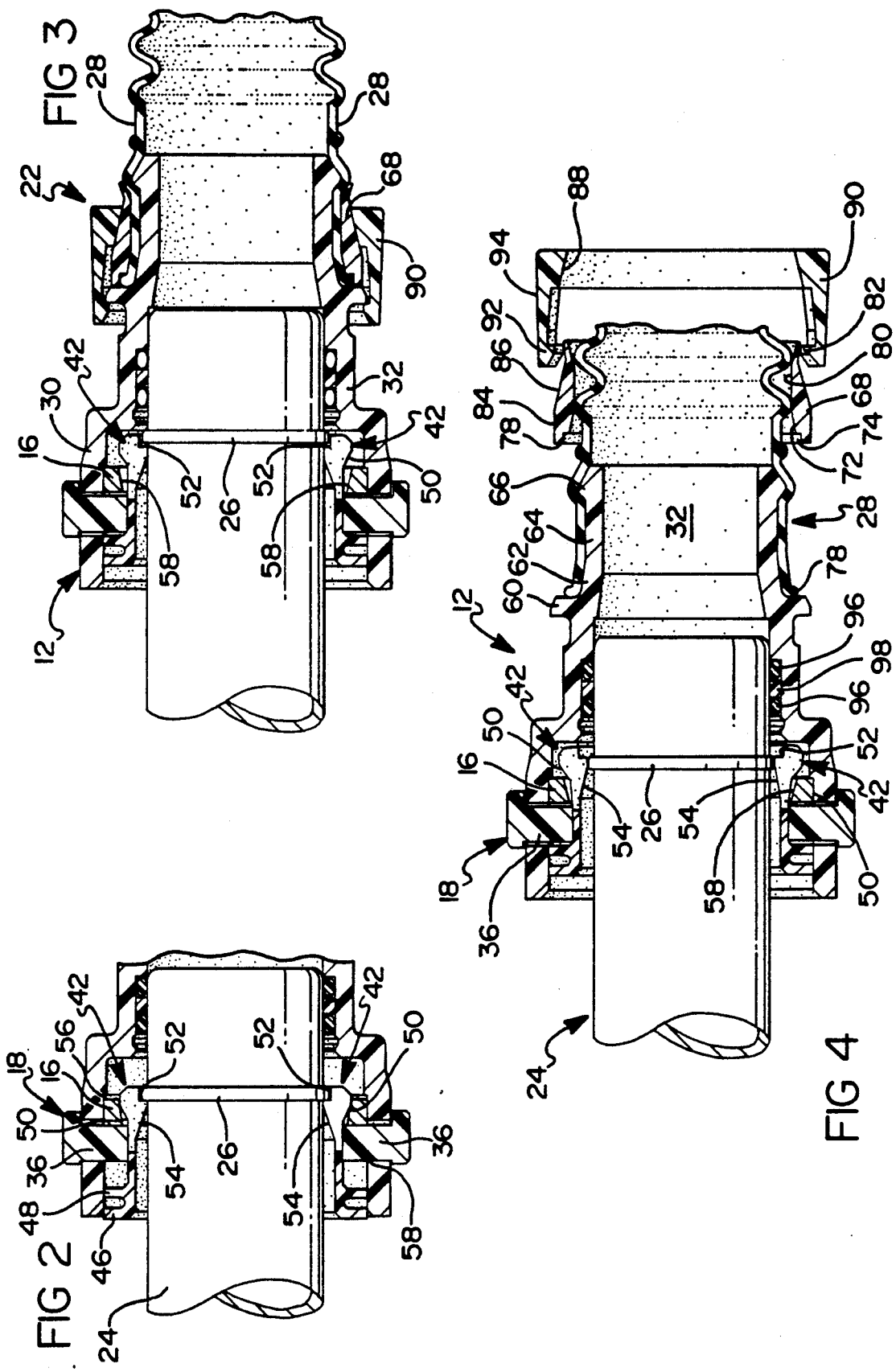

SLIDING COLLAR QUICK CONNECT

FIELD OF THE INVENTION

The present invention relates to quick connectors for connecting tubing sections and more particularly for connecting a fuel tank filler neck to a fuel tank.

BACKGROUND OF THE INVENTION

Low cost quick connectors for connecting tubing have been widely used in the automotive industry as well as other non-automotive industries. Typically, they are used to connect fluid lines that have small diameters and low pull-off requirements.

One example of such a quick connector is known as an interference type connector. This type of connector has expandable fingers mounted in a housing that create a mechanical interference on an upset portion or bead formed on the tube to be connected. The tube and upset are inserted into the connector housing past the expandable fingers. The fingers expand to allow the upset to pass and then retract behind the upset retaining the tube in the housing. The retention or pull off force, i.e. the force required to pull the tube out of the housing, is dependent upon the rigidity of the expandable fingers. Stated another way, the retention force of an interference type connector is determined in large part by the resistance to expansion of the fingers. If the fingers expand easily to allow easy insertion of the tube upset, the pull off or retention force will be low. To get higher retention forces, the fingers have to be more rigid, making insertion of the upset more difficult. Additionally, fingers that are more rigid are more difficult to manually expand to remove the tube when removal is desired.

There are many applications which require very high pull-off forces, but low insertion forces. One such application is the connection of the fuel filler neck to the fuel tank of a vehicle. Pull-off forces in excess of 500 pounds are required. Correspondingly, low insertion forces of only about 20 pounds are required. Because of the need for high pull-off forces and low insertion forces, typical quick connectors are unacceptable for connecting fuel filler necks to fuel tanks. They are also unacceptable in other applications requiring high pull-off forces and low insertion forces.

BRIEF SUMMARY OF THE INVENTION

The present invention overcomes the above problems by providing a connector which has high pull-off forces, in excess of 500 pounds, while having low insertion forces, of below 20 pounds. The quick connector of the present invention has a housing with a locking assembly that receives a fuel line having an upset portion. The locking assembly is capable of providing variable forces with respect to the fuel line with the force being weak upon insertion of the fuel line so that there are low insertion forces and substantially greater when the fuel line is attempted to be pulled out of the housing, i.e. greater pull-out forces.

The locking assembly uses a sliding collar having expandable fingers over which is mounted a compression ring which is permitted to slide relative to the sliding collar. As a fuel line is inserted into the housing, the sliding collar slides axially within the housing away from the compression ring so that the compression ring does not interfere with the expansion of the expandable fingers. In this way, an upset portion can be easily inserted because the insertion force required is the force to expand the fingers which is low, approximately 20 pounds of force. The spacing of the expandable fingers from the compression ring is achieved through the use of a stop within the housing that restricts the axial travel of the compression ring.

Once the fuel line is inserted, the expandable fingers retract back to their normal position behind the upset. If the fuel line is attempted to be pulled out of the housing, the sliding collar axially slides with the fuel line with respect to the compression ring. The compression ring abuts a retaining fork or other stop means which results in it engaging the expandable fingers adjacent their free ends restricting their expansion and retaining the upset within the housing. Depending upon the material and size of the compression ring, the amount of pull-out force can be controlled. In the preferred embodiment, the compression ring is aluminum or stainless steel and negligibly expands providing substantially greater than 500 pounds of pull-out force. To further aid in the retention of the fuel line within the housing, the expandable fingers have a beveled outer surface adjacent their free ends and the compression ring has a mating counter bore so that as the fuel line is pulled, there is greater inward movement of the expandable fingers against the fuel line behind the upset. The angle of the bevel and counter bore virtually act as a cam to cam the expandable fingers inwardly against the tube behind the upset to restrict pull-out of the upset.

The locking assembly is retained within the housing by the retaining fork. The retaining fork is expandable so that it can be snapped over the housing. The fork includes tabs that are adapted to be received within apertures in the housing. The tabs extend into the housing and behind the compression ring to hold both the ring and the collar in the housing. The retaining fork allows an inserted tube to be removed or disconnected. Once a tube has been inserted, to remove the tube the retaining fork has to be expanded and removed from the housing. The locking assembly and tube can then be removed from the housing.

In the disclosed embodiment, the opposite end of the connector housing has a compression connector for connecting a flexible hose to the housing. The housing has a male tubular section which can be inserted into the flexible hose. The male tube has a flared end, a generally straight portion which ends in a conical section and a flange which extends outwardly from the housing at approximately 90° to the tube. A slotted compression sleeve snaps or is otherwise mounted over the flexible hose and the male tube. The compression ring has an interior surface which mates with the exterior surface of the male tube and an exterior surface which has a beveled surface for camming engagement with the beveled inner surface of a snap ring. The snap ring is adapted to be mounted over the compression sleeve. Locking members extend outwardly from the beveled ring for snapping about the flange to lock the snap ring with respect to the housing and exert compressive forces upon the compression sleeve through the camming action of the beveled surfaces to retain the flexible hose upon the housing.

The quick connector of the present invention is preferably used to connect a fuel filler neck to a fuel tank. The variable force of the locking assembly allows for easy insertion of the upset and tube on the fuel tank into the quick connect. Once inserted, the compression ring acts upon the expandable fingers to inhibit their expansion and restrict pull out of the tube. If the quick connect needs to be removed, the retaining fork can be easily removed allowing the locking assembly and tube to be removed from the housing. At the opposite end of the housing, the male tube and compression connector permits a flexible hose or tube to be easily attached to the housing to complete the connection of the filler neck.

These and other objects and advantages of the invention will be apparent after reviewing the drawings and the description thereof wherein:

BRIEF DESCRIPTION OF THE DRAWINGS

FIG. 1 is a perspective view of the connector of the present invention.

FIG. 2 is a partial cross-sectional view of the connector of the present invention illustrating the interaction between the sliding collar and compression ring as the fuel line is attempted to be pulled out of the housing.

FIG. 3 is a cut away view of the connector of the present invention illustrating the connector connected to a fuel line and a flexible tube.

FIG. 4 is a perspective view showing the insertion of the fuel line into the housing and corresponding expansion of the expandable fingers and assembly of the flexible hose to the housing.

DETAILED DESCRIPTION OF THE INVENTION

With reference to FIG. 1, the quick connect of the present invention is shown generally at 10. Broadly, the quick connect of the preferred embodiment includes a housing 12 which is adapted to receive a locking assembly 11 having a sliding collar 14 at its forward end 15. A compression ring 16 is mounted about the collar 14 with both the sliding collar and compression ring being held within the housing 12 by a retaining fork 18. The opposite or rear side 20 of housing 12 includes a compression connector shown generally at 22. As can be appreciated, in the preferred embodiment housing 12 and its component parts are adapted to receive at one end a fuel filler tube or neck 24 which has an upset portion 26 and to be connected at the opposite end to a flexible tube 28.

Housing 12 is preferably made of a plastic material such as, for example, nylon 12. Housing 12 includes a first section 30 having a first diameter large enough to receive tube 24 and locking assembly 11 and a second section 32 which has a reduced diameter. First section 30 receives locking assembly 11 which includes sliding collar 14 and compression ring 16. Collar 14 and ring 16 are retained in housing 12 by retaining fork 18 which snaps over housing 12. Retaining fork 18 has tabs 36 that are inserted into housing 12 through apertures 34. The tabs 36, when inserted into apertures 34, are positioned between the forward end 15 of housing 12 and the compression ring 16 to retain the compression ring 16 and the sliding collar 14 within housing 12.

The retainer fork 18 is disclosed as being generally u-shaped having its free ends angled inwardly so that upon forcing the fork 18 against housing 12, the legs 41 separate to allow the retaining fork to be snapped about the housing 12 and tabs 36 to be received within apertures 34 in a gripping manner. As should be appreciated, the fork 18 is made of resilient material such as for example plastic or nylon 6/6 so it can be flexed without deforming. Because of its resiliency, the legs 41 of fork 18 can be spread open manually to move fork 18 from housing 12 so that the sliding collar 14 and ring 16 can be removed. This will be discussed in greater detail below when removal of tube 24 is discussed.

In the preferred embodiment, sliding collar 14 is made of plastic, for example from nylon 6/6. Sliding collar 14 is generally tubular in shape and has expandable fingers 42 which are preferably formed by slotting collar 14 at 44. Slotting allows the expandable fingers 42 to expand outwardly upon insertion of upset 26 and to be compressed inwardly by compression ring 16 when the assembled tube 24 is pulled rearwardly out of housing 12. The forward end of sliding collar 14, the end adjacent to the forward end 15 of housing 12, has bearings 46 and 48 which engage the inner wall of first section 30 so that collar 14 can slide axially. In the disclosed embodiment, there are two bearings 46 and 48, but it should be understood by one of ordinary skill in the art that a single bearing or a greater number of bearing surfaces could be used to obtain the desired result, free axial sliding of collar 14 within housing 12.

The interior diameter of sliding collar 14 is sufficiently dimensioned so that both the tube 24 and the upset 26 can be received without interference until the upset contacts the angled inner surface 54 of fingers 42. As can be seen in FIG. 2, the expandable fingers 42 have an angled inner surface 54, a flared exterior surface 50, and a notch 52 along the interior of fingers 42. The angled inner surface 54 is engaged by upset 26 as tube 24 is inserted into housing 12 which causes expandable fingers 42 to expand outwardly allowing upset 26 to pass. This can be seen in FIG. 4. Once upset 26 passes inner surface 54 and is adjacent notch 52, fingers 42 retract back to their normal position with the notch 52 engaging upset 26, see FIG. 2.

Mounted about expandable fingers 42 is compression ring 16. In the preferred embodiment, ring 16 is made of aluminum or stainless steel (higher strength). The axial travel of compression ring 62 is limited by a stop 56 formed in the interior of housing 12, which in the disclosed embodiment is a step formed in the inner wall of housing 12, see FIG. 2. Travel in the opposite direction is limited by retainer 18 and more specifically tabs 36. As can be seen in FIGS. 3 and 4, the compression ring 16 has a counterbore 58 resulting in the interior surface of ring 16 being angled. This angled surface 58 engages the flared end 50 of sliding collar 14 when tube 24 is pulled rearwardly or attempted to be pulled out of housing 12. Upon engagement, surface 58 and flared end 50 act as a cam forcing fingers 42 in the direction of tube 24 preventing upset 26 from being disengaged from notch 52 and likewise housing 12. As should be appreciated by one of ordinary skill in the art, the greater the pulling force on tube 24, the greater the downward force of expandable fingers 42 and the greater the retention force on upset 26 to retain tube 24 within housing 12. The compression ring 16 compresses fingers 42 in the direction of tube 24 and restricts their expansion to hold tube 24 in housing 12. Due to this locking assembly 11, pull out forces in excess of 500 pounds with insertion forces of less than 20 pounds can be achieved.

The second section of housing 12 is adapted for receipt of a flexible hose or tube 28. In the disclosed embodiment, a compression connector shown generally at 22 is used to connect tube 28 to housing 12. The second section is configured in the disclosed embodiment for receipt of hose 28 and compression connector 22. The exterior of the second section 32 includes a flange 60 an inclined portion 62 which ends in a generally straight portion 64 which in turn ends in a flared end 66.

With reference to FIG. 4, the second section 32 of housing 12 is shown inserted into a flexible hose or tube 28. As can be seen, the hose is pushed onto the second section 32 until the end of the hose abuts flange 60. Once the hose is positioned as shown, a compression sleeve 68 can be fitted over the tube 28 between flange 60 and flared end 66, see FIG. 3. The compression sleeve 68 is preferably made of nylon 6/6 material and has a slot 70 so that it can be opened for receipt around tube 28 and second portion 32 so it can be compressed. Sleeve 68 can be mounted over section 32 in various ways, compression sleeve 68 can be placed over the hose 28, with hose 28 and sleeve 68 then being slid over section 32. A second way is to force compression sleeve 68 over tube 28 after tube 28 has been properly positioned on section 32.

Sleeve 68 has an interior configuration which conforms to the exterior configuration of section 32. It includes a groove 74 at its forward end 76 which receives the bulbous end 78 of hose 28. Extending inwardly from groove 74 is an incline 72 which mates with the inclined surface 62 on section 32. A generally straight inner wall 80 which mates with the generally straight outer wall 64 of section 32. And, an upwardly or outwardly flared end 82 which mates with the flared end 66 of section 32.

The exterior of compression sleeve 68 has a relatively flat first surface 84 which ends in an inwardly angled section 86 which terminates in flared portion 82. The exterior surface is designed to engage and cammingly react to the correspondingly angled inner surface of a locking ring 90 which fits over compression sleeve 68 and is snapped by hooks 92 behind flange 60. Locking ring 90 is preferably made of nylon 6/6 material. In the disclosed embodiment there are two snapping hooks 92 which are at the end of resilient legs 94 for snapping about flange 60. As should be appreciated by one of ordinary skill in the art, as locking ring 90 is forced over compression sleeve 68, compression sleeve 68 is compressed by the interior inclined surface 88 of locking ring 90. This compression causes slot 70 to close compressing compression sleeve 68 about tube 28 to tightly hold it on housing 12.

In use, the quick connector 10 provides a quick effective low cost method for connecting a fuel filler neck to a fuel tank. To assemble the tube 24 to the housing, it is merely necessary to insert tube 24 into housing 12 until the expandable fingers 42 snap behind upset 26. In use, the quick connect 10 would be pre-assembled with the sliding collar 14 and ring 16 inserted into the housing 12 and the retaining fork 18 snapped in place. As tube 26 is inserted into housing 12, sliding collar 14 slides away from the forward end 15 with compression ring 16 staying stationary due to engagement with stop 56. As can be seen in FIG. 4, with compression ring 16 stationary, expandable fingers 42 are free to expand with no interference allowing upset 26 to easily be inserted. The amount of force needed to insert tube 24 due to the lack of interference on fingers 42 is approximately 20 pounds. When fully inserted, the fingers 42 snap behind upset 26 to hold tube 24 in housing 12. The inserted end of tube 24 is sealingly received within O-rings 96 which in the preferred embodiment are separated by a spacer 98.

Referring to FIG. 2, the pull-out reaction of the expandable fingers 42 and compression ring 16 is illustrated. As tube 24 is attempted to be pulled out of housing 12, sliding collar 14 slide towards the forward end 15 of housing 12. As collar 14 slides expandable fingers 42 are engaged by compression ring 16 which is held stationary by tabs 32. This forces fingers 42 downwardly against tube 24 and prevents fingers 42 from expanding to release upset 26. The flared end 50 of fingers 42 is cammed downwardly by the counterbored or angled surface 58 of compression ring 16. It has been found that forces exceeding 500 pounds are required to extract tube 24 from housing 12.

To connect the connector 22, the compression sleeve 68 and locking ring 90 are slid over the end of hose 28. Hose 28 is then slid over section 32 of housing 12 until it abuts flange 60. Thereafter, sleeve 68 can be slid onto section 32. Alternatively, sleeve 68 could be slid onto section 32 simultaneously with hose 28 or snapped over hose 28 after hose 28 is in place. Once sleeve 68 is properly positioned between flange 60 and flared end 66, locking ring 90 can be slid over sleeve 68 and locked onto flange 60. As discussed above, the angled surfaces of ring 90 and sleeve 68 cause sleeve 68 to compress about hose 28.

Disconnecting tube 24 and hose 28 from connector 10 is as easy and quick as making the connection. Tube 24 is disconnected by removing fork 18 from housing 12. Once fork 18 is removed, the sliding collar 14 and ring 16 are free to be removed from housing 12. If desired, tube 24 can be reassembled after removal by reinserting tube 24 with collar 14 and ring 16 attached and snap fork 18 in place to once again retain tube 24. To remove hose 28, ring 90 is unhooked from flange 60 and tube 28 is pulled off of section 32.

It should be appreciated by those of ordinary skill in the art that the quick connect as shown does not require the compression connector 22. The compression connector 22 could be replaced by a simple band clamp in attaching a flexible hose 28 to housing 12. Alternatively, the compression connector 22 could be used on other types of connectors wherein a flexible hose is being connected to a flared tube. Therefore, the two connectors illustrated, although illustrated as a single quick connect system could be employed separately in connecting tubing or hoses. Further, the present invention has been disclosed as being preferable for connecting a fuel filler neck, but other applications requiring large pull out forces and very low insertion forces would benefit from this type of connector.

The foregoing description is made for purposes of illustration only and is not intended to limit the scope of the invention which is only to be determined from the appended claims.

What is claimed is:

1. A fuel filler line connector for connecting a fuel filler line having an upset portion, said connector comprising:
   a housing having opposed ends;
   an axially slidable locking means slidably mounted within said housing adjacent one of said opposed ends, said locking means having first and second cooperating relatively slidable members providing a variable force in a generally lateral direction to said fuel line with said force being weak upon insertion of said fuel line such that said fuel line can be easily inserted into said housing until said fuel line is locked within said housing and said force being substantially greater upon said fuel line when said fuel line is pulled in a direction away from said housing;

said first member of said locking means is an annular collar for receiving said fuel line, said collar including expanding fingers for expanding about said upset portion of said fuel line upon insertion of said fuel line into said housing and collar; and a retaining means for axially slidable retaining said locking means within said housing.

2. The fuel line connector of claim 1, wherein said second member of said locking means is a compression ring slidably mounted upon said collar for varying the forces applied to said fuel line.

3. The fuel line connector of claim 2, wherein said retaining means includes a resilient band having retention tabs, said retention tabs being adapted for receipt within apertures in said housing such, that said tabs extend into said housing between said one opposed end of the housing and said compression ring.

4. The fuel line connector of claim 2, wherein said compression ring encompasses said engaging fingers to prevent said engaging fingers from expanding to release said fuel line.

5. The fuel line connector of claim 1, wherein said first member of said locking means is an annular collar for receiving said fuel line, said collar including expanding fingers for expanding about said upset portion of said fuel line upon insertion of said fuel line into said housing and collar, said expanding fingers retracting adjacent said upset between said upset and said one opposed end upon complete insertion of said upset; and said second member is a compression ring slidably mounted upon said collar for varying the forces applied to said fuel line.

6. The fuel line connector of claim 1, wherein said opposite end of the housing includes a second connecting means for connecting a second tube to said connector.

7. A quick connect assembly for connecting a fuel line, said quick connect assembly comprising:

a housing having opposed ends with one of said ends being adapted to receive a fuel line having an upset adjacent an end thereof;

a sliding collar slidably mounted within said housing for axial movement therein, said sliding collar including expandable fingers adapted to expand outwardly as said upset is inserted and to retract inwardly after said upset is inserted past said expandable fingers;

a compression ring slidably mounted about said sliding collar, said expandable fingers sliding away from said compression ring as said fuel line is inserted into said housing with said expandable fingers being expandable without restriction, said expandable fingers sliding towards said compression ring as said fuel line is pulled in a direction away from said housing, with said expandable fingers having their expansion restricted by said compression ring.

8. The quick connect of claim 7, further including a retaining means for retaining said sliding collar and said compression ring in said housing, said retaining means having a resilient band with retention tabs, said retention tabs being adapted for receipt within apertures in said housing such that said tabs extend into said housing between said one opposed end and said compression ring.

9. The quick connect of claim 7, further including bearing means on said sliding collar for facilitating axial movement of said sliding collar within said housing.

10. The quick connect of claim 7, further including a stop within said housing to stop movement of said compression ring as said sliding collar slides.

11. The quick connect of claim 7, wherein said retaining means engages said compression ring as said fuel line is pulled away from said housing, said retaining means stopping movement of said compression ring with respect to said expandable fingers with said expandable fingers being compressed against said upset as said expandable fingers move with respect to said compression ring to prevent said fuel line from being removed from said housing.

12. The quick connect of claim 7, wherein said opposite end of the housing includes a second connecting means for connecting a second tube to said connector.

13. The quick connect of claim 12, wherein said second connecting means includes a flared end, an adjacent portion ending in a conical section and a flange adjacent said conical section, said second tube being adapted for positioning about said flared end, recessed portion and conical section and to abut said flange, a compression sleeve adapted to be mounted about said second tube and said recessed portion and conical section, said compression sleeve having a first outer diameter increasing to a second larger outer diameter, and a locking ring adapted to be mounted about said compression sleeve, said locking member compressing said compression sleeve about said second tube and said recessed portion and said conical section to retain said tube to said housing.

14. The quick connect of claim 7, wherein said opposite end includes a second connecting means for connecting a tube to said connector, said second connecting means including a tubular extension extending from said housing, a compression sleeve adapted to be mounted about said tubular extension, said compression sleeve having a first outer diameter increasing to a second outer diameter, and a locking ring adapted to be mounted about said compression sleeve, said locking member compressing said compression sleeve about said second tube to retain said second tube upon said tubular extension.

15. A connector for interconnecting a fluid line, said connector comprising:

a housing having opposed ends;

one of said ends of said housing having a flared end, an adjacent recessed portion ending in a conical section and a flange adjacent the conical section, said one end adapted for insertion into said fluid line, a compression sleeve adapted to be mounted about said fluid line, said compression sleeve having a first outer diameter increasing to a second larger diameter, and a locking ring adapted to be mounted about said compression sleeve, said locking ring having expandable fingers adapted to snap over said flange compressing said locking member about said hose and locking said compression ring in said compressed position, to retain said fluid line to said housing.

16. The connector of claim 15, further including a sliding collar slidably mounted within said housing at said opposite end for axial movement therein, said sliding collar including expandable fingers adapted to expand outwardly as a fluid line having an upset is inserted and to retract inwardly after said upset is inserted past said expandable fingers;

a compression ring slidably mounted about said sliding collar, said expandable fingers sliding away from said compression ring as said fluid line is inserted into said housing such that said expandable fingers can expand without restriction and said expandable fingers sliding towards said compression ring as said fluid line is pulled in a direction away from said housing, restricting expansion of said expandable fingers.

17. The quick connect of claim 16, further including a retaining means for retaining said sliding collar and said compression ring in said housing, said retaining means having a resilient band with retention tabs, said retention tabs being adapted for receipt within apertures in said housing such that said tabs extend into said housing between said opposite end and said compression ring.

18. The quick connect of claim 16, further including a stop within said housing to stop movement of said compression ring as said sliding collar slides.

19. The quick connect of claim 16, wherein said retaining means engages said compression ring as said fuel line is pulled away from said housing, said retaining means stopping movement of said compression ring with respect to said expandable fingers with said expandable fingers being compressed by said compression ring against said upset to prevent said fluid line from being removed from said housing.

20. A fuel filler neck connector for connecting a fuel filler neck having an upset portion, said connector comprising:

a housing having opposed ends;

an axially slidable locking means slidably mounted within said housing adjacent one of said opposed ends, said locking means having first and second cooperating relatively slidable members providing a variable force in a generally lateral direction to said fuel line with said force being weak upon insertion of said fuel line such that said fuel line can be easily inserted into said housing until said fuel line is locked within said housing and said force being substantially greater upon said fuel line when said fuel line is pulled in a direction away from said housing;

said second member of said locking means is a compression ring slidably mounted upon said first member for varying the forces applied to said fuel line;

a retaining means for axially slidably retaining said locking means within said housing.

21. The fuel line connector of claim 20, wherein said first member of said locking means is an annular collar for receiving said fuel line, said collar including expanding fingers for expanding about said upset portion of said fuel line upon insertion of said fuel line into said housing and collar.

22. The fuel line connector of claim 20, wherein said first member of said locking means is an annular collar for receiving said fuel line, said collar including expanding fingers for expanding about said upset portion of said fuel line upon insertion of said fuel line into said housing and collar, said expanding fingers retracting adjacent said upset between said upset and said one opposed end upon complete insertion of said upset.

23. The fuel line connector of claim 20, wherein said retaining means includes a resilient band having retention tabs, said retention tabs being adapted for receipt within apertures in said housing such that said tabs extend into said housing between said one opposed end and said compression ring.

24. The fuel line connector of claim 20, wherein said compression ring encompasses said expanding fingers to prevent said expanding fingers from expanding to release said fuel line.

25. The fuel line connector of claim 20, wherein said opposite end of the housing includes a second connecting means for connecting a second tube to said connector.

* * * * *